April 21, 1936. J. W. HENLEY 2,038,108
SINKER
Filed Nov. 3, 1933
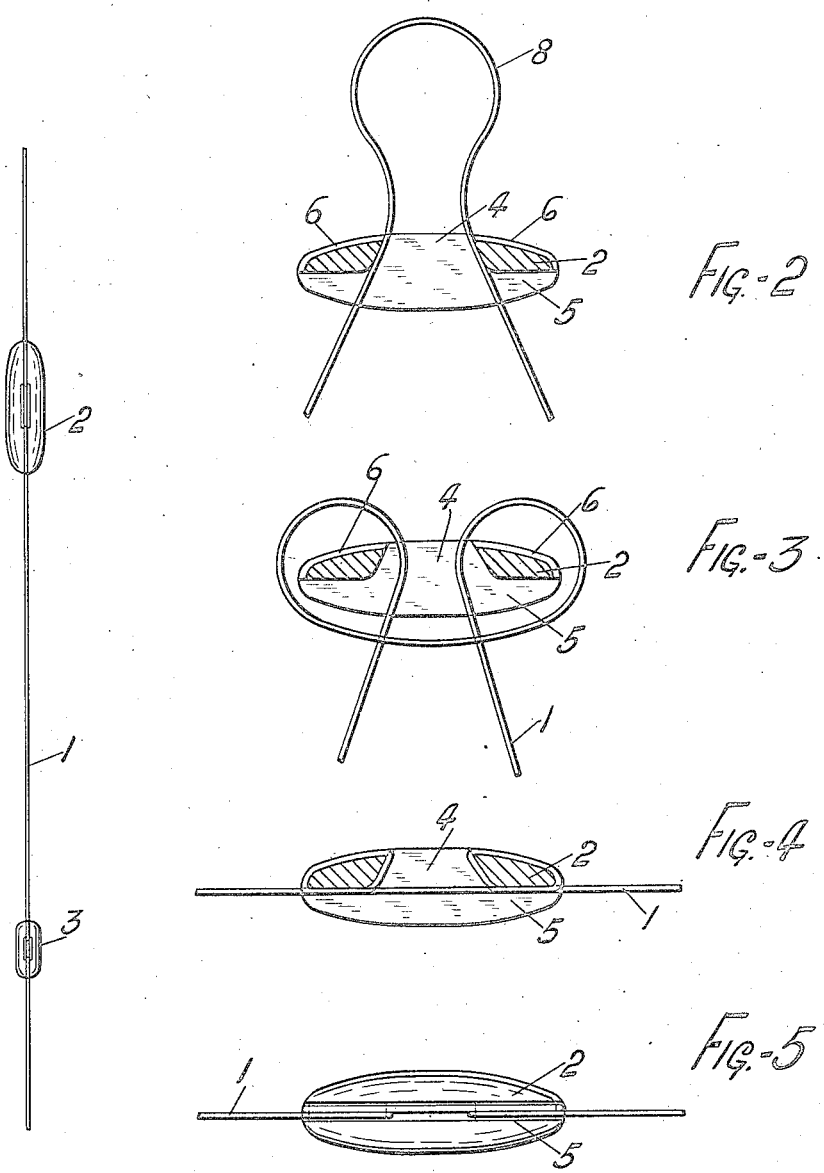
INVENTOR
JAMES W. HENLEY
BY Ely & Barrow
ATTORNEYS Patented Apr. 21, 1936

2,038,108

UNITED STATES PATENT OFFICE 2,038,108

SINKER

James W. Henley, Lewisville, Ind., assignor to The Enterprise Manufacturing Company, Akron, Ohio, a corporation of Ohio Application November 3, 1933, Serial No. 696,489

8 Claims. (Cl. 43—52)

The object of the present invention is to design a new and improved form of sinker for use on fishing lines which can be attached to the line at any point after the bait and hook or float have been attached. Sinkers which have been used for this purpose heretofore have been of the usual split type which are pinched onto the line. Sinkers of this type are objectionable for the reason that if they are pinched sufficiently to hold the sinker firmly in position, the line will be injured or weakened. The new form of sinker illustrated and described herein may be attached to the line at any point without disturbing the bait, hook or other attachments and will not pinch the line or weaken it. It will stay in the position in which it is secured and will not slip. It is capable of repeated use and as it does not require bending of the metal to secure it in place, can be used repeatedly.

The sinker is so constructed that it will occupy a position with the line substantially at the axis of the spinner. It is so shaped that it will not catch in weeds or other obstructions. It is designed so that it can be made inexpensively and the principles may be used in all sizes and in other forms than that specifically shown.

In the drawing:

Figure 1 is a view showing a line with large and small sinkers mounted thereon;

Figure 2 is a cross-section through a sinker, preferably of a larger size, showing the first step in applying it to the line;

Figure 3 is a similar view showing the second step;

Figure 4 is a view showing the line drawn into position on the sinker; and

Figure 5 is a view looking at the bottom of the sinker.

In the drawing, which shows the preferred form of the invention, a section of a fishing line is indicated at 1 and the two sinkers at 2 and 3, the former being the larger sinker which is shown more in detail in the other views, it being understood that refinements of the invention may be omitted from either size if found desirable or unnecessary. The sinker is a cast metal body, preferably lead, or lead with a small proportion of antimony or other alloy so as to harden the lead somewhat. The body is made with a full transverse passage 4 and with a longitudinal groove 5 at one side of the body and communicating with the passage. If desired, auxiliary grooves 6 may be provided on the side of the sinker opposite the groove 5 in which the line will be received, but the formations of the grooves may be altered. These grooves 6 may extend to the opposite end of the passage or may be formed on the ends of the sinker only.

In attaching the sinker, a loop or bight 8 is made in the line at the point of attachment. This loop or bight is then passed through the hole 4 from the side where the groove 5 is located. The loop is then brought around the sinker body and the two sides of the line drawn out so that the loop seats in the groove 5, and the sinker is thus brought into axial alignment with the line. The remainder of the loop will seat in the grooves 6 so that the line will be seated within the confines of the sinker, the final position being shown in Figures 4 and 5.

It will thus be seen that the objects of the invention are accomplished and the disadvantages of former types of sinkers obviated. The sinker will stay in position and will not pinch or destroy the line. The surfaces of the sinker are smooth and unbroken so that it will not catch in obstructions or weeds. Other advantages will be apparent to the fisherman and changes and modifications such as will not destroy the objects of the invention will be apparent.

What is claimed is:

1. A sinker having a body with a transverse passage and a groove extending longitudinally of the sinker and communicating with the passage on one side thereof, and shallow grooves extending from the ends of the first named groove and communicating with the passage on the opposite side thereof.

2. A sinker having a body with a transverse passage and a groove extending longitudinally of the body and communicating with the passage, the base of the groove being located at the axis of the body, and auxiliary grooves leading from the main groove and extending over the ends of the body, said auxiliary grooves being in the same plane as the main groove.

3. Fishing tackle comprising a sinker having a body with a transverse perforation therethrough and a groove extending longitudinally of the sinker and communicating with the said perforation, and a line having a loop therein extending through the said perforation and longitudinally about the body and seated in the base of the groove.

4. Fishing tackle comprising a sinker body having a transverse passage therethrough and a groove extending longitudinally of the body and communicating with one side of the passage and other grooves extending around the body and communicating with the passage on the opposite side thereof, and a line having a loop therein extending through the transverse passage and seated in the grooves.

5. Fishing tackle comprising a sinker having a body with a transverse passage and a groove extending longitudinally of the body and communicating with the passage, and a line having a loop therein extending through the transverse passage and longitudinally about the body and seated in the base of the groove, the straight portion of the line on either side of the body being located at the axis thereof.

6. Fishing tackle comprising a line, and a sinker body secured in a bight in the line, said bight seating in grooves that extend longitudinally of the sinker body on opposite sides thereof, and from one end of the body to the other, the bottom of one of said grooves being coincident with the longitudinal axis of the body.

7. Fishing tackle comprising a line, and a sinker body secured in a bight in the line, said bight extending through a perforation in said sinker body and seating in grooves extending longitudinally of the body each side of said perforation.

8. Fishing tackle comprising a line, and a sinker body secured in a bight in the line, said body being formed with a longitudinal groove extending to the axis of the body, and a longitudinal groove coincident with said axis, a portion of said bight lying in both grooves whereby said body is coaxially disposed with relation to the line in the second groove.

JAMES W. HENLEY.